United States Patent Office 3,118,868
Patented Jan. 21, 1964

3,118,868
SULPHURISED VAT DYESTUFFS IN SOLUBILISED FORM
Henry Beilby Appleton, Lindley, Huddersfield, England, assignor to L. B. Holliday & Company Limited, Huddersfield, England, a British company
No Drawing. Filed Oct. 23, 1961, Ser. No. 147,035
Claims priority, application Great Britain Nov. 7, 1960
2 Claims. (Cl. 260—128)

This invention relates to a process for the manufacture of preparations of dispersed or solubilised reduced sulphurised vat dyestuffs.

The term "sulphurised vat dyestuff" is in the literature and as used herein reserved for the section of the generic class of sulphur dyestuffs which in use must be dyed from a sodium sulphide and sodium hydrosulphite bath. Typical of this class are the thionation products of the leuco indophenols of carbazole, alkyl carbazole and acyl derivatives of carbazole and the thionation product of N-4-hydroxyphenyl-$\beta$-naphthylamine.

The present invention provides a process for the manufacture of preparations of dispersed or solubilised reduced sulphurised vat dyestuffs wherein a sulphurised vat dyestuff is reduced in a substantially neutral medium though not below pH 7 by the sodium salt of hydroxyethane sulphinic acid and without the addition of caustic alkali during the reduction.

Preferably the reaction is effected at a pH between 7 and 8 and the degree of reduction will not exceed one third of the total reduction of the dyestuff, this limiting reduction being the maximum degree of reduction possible with the reducing agent employed, irrespective of the amount of reducing agent used in excess of that required to obtain the desired degree of reduction.

The sodium salt of hydroxyethane sulphinic acid has been known for a long time but has had little technological importance because of the difficulty in manufacture due to its instability, the difficulty of isolation in the solid form and to the fact that it steadily deteriorates due to decomposition after manufacture.

These adverse properties indicated that it would only be useful when its instability could be turned to practical use as for instance in the so-called "flash-ageing" process or two stage printing process as described in British Patent No. 829,177 for printing textile materials.

The sodium salt of hydroxyethane sulphinic acid is much less stable than the sodium salt of hydroxymethane sulphinic acid, consequently it reduces at room temperature or very rapidly at slightly elevated temperatures, furthermore, during the course of reduction the volatile acetaldehyde released when the reducing agent decomposes passes from the reduction mass as it is so much less reactive under the operating conditions than formaldehyde, for this reason no precautions have to be taken to avoid the detrimental secondary reactions which take place with the use of the sodium salt of hydroxymethane sulphinic acid when formaldehyde binding agents have to be added in order to obtain full yields of the reduced dyestuffs in application, and in brighter shade than the ones previously obtained by the use of sodium sulphide or sodium hydrosulphide.

The hydroxyethane sulphinic acid sodium salt is produced by the method described in Friedlander Fortschritte der Teerfarbenfabrikation und Verwandten Industriezweige, Part 8 (1905–1907), p. 50, but after concentration to the stage where the sodium sulphite crystallises out the solution of the hydroxyethane sulphinic acid sodium salt is centrifuged and used at once for the reduction without attempting to isolate in the solid form.

Therefore, apart from all the advantages which are common to the use of both the sodium salts of hydroxymethane sulphinic acid and hydroxyethane sulphinic acid, in the preparation of the reduced and solubilised forms of the sulphurised vat dyestuffs of the class of thionated leuco indophenols of carbazole, over the previously known prepaartions using sodium sulphide, polysulphides or hydrosulphide, we find that the sodium salt of hydroxyethane sulphinic acid has even greater advantages which make it ideal as the reducing agent.

The reduction can be carried out at normal temperature or at slightly elevated temperatures, no aldehydebinding agent is necessary consequently the dry dyestuff preparations are stronger and the process is carried out more rapidly since the reduction takes place more quickly than with the hydroxymethane sulphinic acid compound.

The reaction is carried out in a substantially neutral medium and since the degree of reduction is limited the amount of reducing agent is not critical.

The following example, in which the parts are by weight, illustrates the invention:

*Example*

120 parts of a 30% paste of the thionation product of carbazole leuco-indophenol (C.I. 53630) was converted into a free flowing smooth paste in the known manner by the addition of 26 parts of the sodium salt of dinaphthyl methane sulphinic acid and it was then brought to pH 7 to 8 by the careful addition of caustic soda during the passage through a paste mill.

To the smooth paste was then added 30 parts of a 40% solution of the sodium salt of hydroxyethane sulphinic acid and the mass was stirred for one hour at ambient temperature (alternatively the temperature may be raised to 30–40° C. before reduction and the reduction carried out for 20 minutes, followed by cooling to room temperature).

12 parts of caustic soda were then added in the form of a 30% solution and the whole mass was stirred for a further 30 minutes.

The preparation can then be used in paste form or dried to a powder yielding a blue dyestuff soluble or dispersible in water which dyes by the known methods to give full blue shades of excellent brightness.

I claim:
1. A process for the manufacture of preparations of solubilised reduced sulphurised vat dyestuffs which comprises subjecting a sulphurised vat dyestuff to reduction by contacting it with the sodium salt of hydroxyethane sulphinic acid in a substantially neutral medium having a pH not less than 7 nor appreciably greater than 7 and without the addition of caustic alkali during the reduction.
2. A process for the manufacture of preparations of solubilised reduced sulphurised vat dyestuffs which comprises subjecting a sulphurised vat dyestuff to reduction by contacting it with the sodium salt of hydroxyethane sulphinic acid at a pH between 7 and 8 and without the addition of caustic alkali during the reduction.

References Cited in the file of this patent

FOREIGN PATENTS 1,071,653 Germany _____ Dec. 24, 1959
1,071,654 Germany _____ Dec. 24, 1959

OTHER REFERENCES

Blum et al., American Dyestuff Reporter, 43, 525–540 (1954).